United States Patent [19]

Blechschmidt et al.

[11] Patent Number: 5,110,151
[45] Date of Patent: May 5, 1992

[54] SHIM AND COMPUTERIZED CHART FOR SIMULTANEOUSLY ADJUSTING CAMBER AND TOE-IN

[75] Inventors: James L. Blechschmidt, Tempe; Robert D. Johnson; Robert F. Powell, both of Mesa, all of Ariz.

[73] Assignee: Shimco, Inc., Mesa, Ariz.

[21] Appl. No.: 653,884

[22] Filed: Feb. 11, 1991

Related U.S. Application Data

[63] Continuation-in-part of Ser. No. 494,963, Mar. 16, 1990, Pat. No. 5,007,658.

[51] Int. Cl.⁵ .................................. B62D 17/00
[52] U.S. Cl. ................................. 280/661; D8/354; 33/613; 384/626; 425/DIG. 129
[58] Field of Search .................. 280/661; 33/613; D8/354; 384/626; 425/DIG. 129

[56] References Cited

U.S. PATENT DOCUMENTS 4,684,150  8/1987  Specktor et al. ............... 280/661
4,872,699  10/1989  Grove et al. .................. 280/661

Primary Examiner—Kenneth R. Rice
Attorney, Agent, or Firm—Tod R. Nissle

[57] ABSTRACT

Computerized chart apparatus for selecting a shim to simultaneously adjust the toe-in and camber of the wheel assembly of a vehicle.

12 Claims, 6 Drawing Sheets

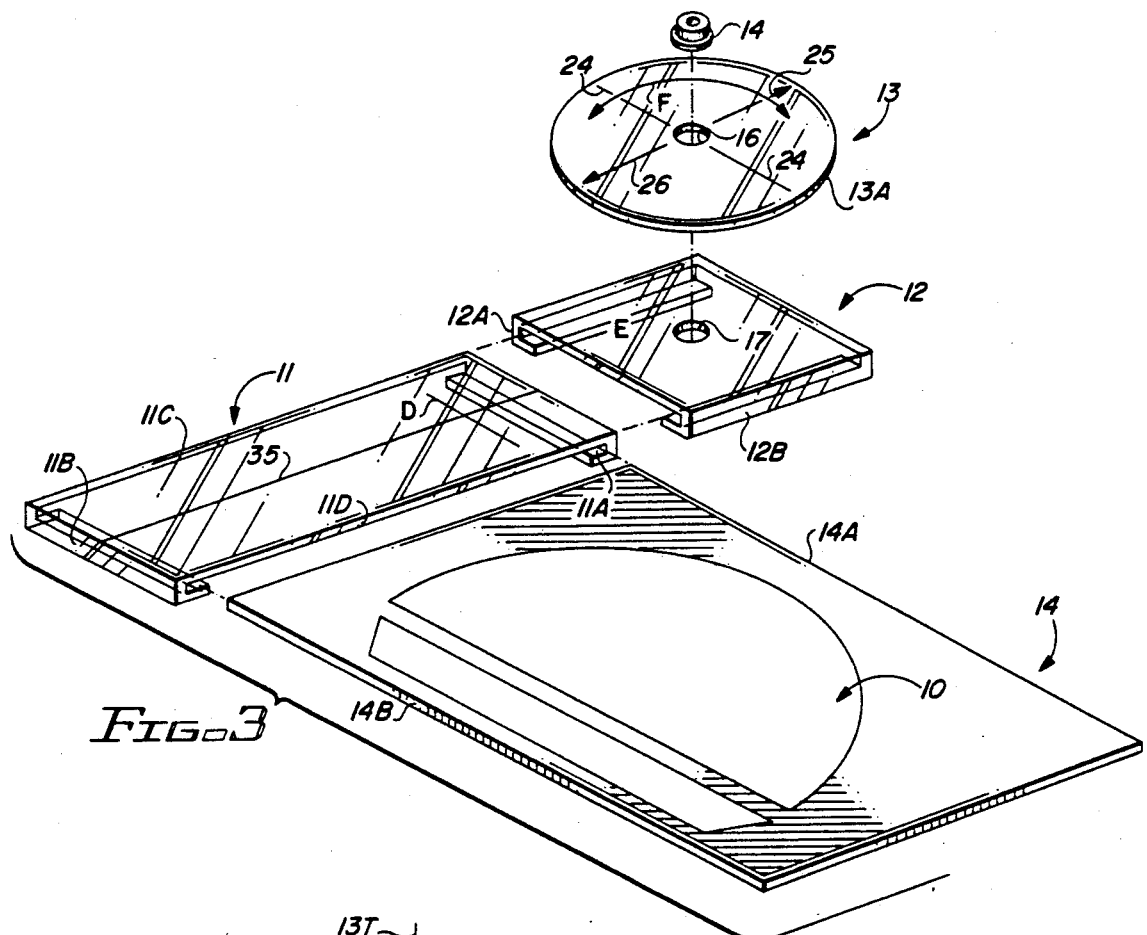
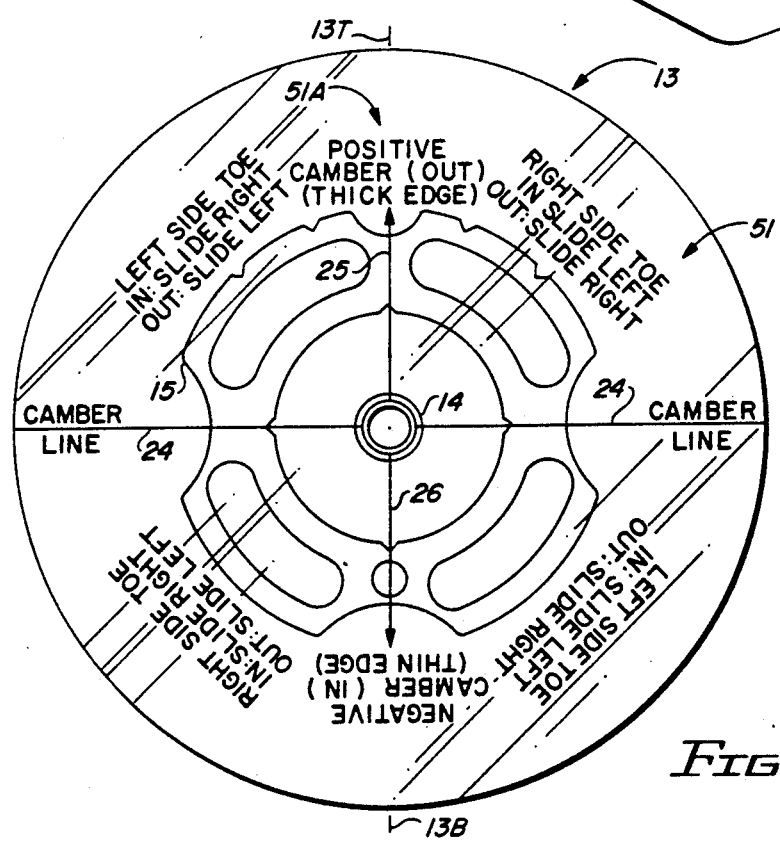

SHIM AND COMPUTERIZED CHART FOR SIMULTANEOUSLY ADJUSTING CAMBER AND TOE-IN

This application is a continuation-in-part of Ser. No. 07/494,963, filed Mar. 16, 1990, now U.S. Pat. No. 5,007,658.

This invention relates to apparatus for adjusting the alignment of the wheels of a vehicle.

More particularly, the invention relates to apparatus which can be utilized to simultaneously adjust the toe-in and camber of the wheels of a vehicle.

In a further respect, the invention relates to shim apparatus which is interposed between a spindle and associated axle member of a vehicle, the spindle carrying one of the wheels of the vehicle and being removably secured to the axle member.

In another respect, the invention relates to shim apparatus of the type described which can be utilized in conjunction with a computerized selector chart to adjust only the camber of the wheel of a vehicle, to adjust only the toe-in of the wheel, or, to simultaneously adjust both the toe-in and the camber of the wheel.

The use of shims to adjust the camber of the front wheels of a vehicle is well known in the art. See, for example, U.S. Pat. Nos. 4,037,680 to Grove and 4,195,862 to Specktor et al. Both the Grove and Specktor patents describe a circular tapered shim which is interposed between a spindle and associated steering knuckle on the front axle of a vehicle in order to adjust the camber of the wheel carried on the spindle. While the shim disclosed in the Grove patent has achieved widespread commercial acceptance, there are several disadvantages associated with the shim.

A wheel spindle is normally maintained adjacent its associated steering knuckle by threaded bolts which extend outwardly from the steering knuckle and pass through apertures formed in the spindle. Nuts threaded onto the bolts secure the spindle against the steering knuckle. The Grove shim is generally installed by removing the wheel from the spindle, loosening and removing the nuts from the steering knuckle bolts, pulling the spindle away from the steering knuckle and off the bolts, sliding the shim over the bolts to a position adjacent the steering knuckle, sliding the spindle back onto the bolts toward the steering knuckle, threading the nuts on the bolts to force the spindle securely adjacent the steering knuckle, and remounting the wheel on the spindle. The Grove shim is circular and is provided with spaced circular openings passing through the shim. The steering knuckle bolts pass through these openings when the shim is slid onto the bolts.

After the Grove shim has been interposed between the spindle and the steering knuckle and the wheel remounted on the spindle, the camber of the wheel can be measured. If the camber is incorrect, then the wheel and spindle must again be completely removed from the axle, the shim removed, another differently sized shim installed, and the spindle and wheel reattached to the axle. Thus, achieving the proper wheel camber by utilizing the Grove shim can be time consuming.

Another drawback of the Grove shim is that it is not adapted to adjust the toe-in of a wheel. It would be advantageous to have the capability to alter the toe-in of a vehicle wheel without having to adjust the tie-rod or other structural component of the suspension system of the vehicle.

A shim similar to the Grove shim was marketed by Ingalls Engineering Company, Inc. under the name "Camber Plate 126" and "Camber Plate 128". These Ingalls Engineering Company camber plates had the same general shape as the Grove shim earlier discussed, but utilized arcuate grooves in place of the circular apertures found in the Grove shim. The Ingalls' camber plates were, like the Grove shim, only used to adjust camber and were not utilized to adjust the toe-in. Toe-in was adjusted using the tie rod of the vehicle.

Finally, neither the Grove patent, the Ingalls' camber plates, nor any other prior art appears to disclose shim apparatus which can simultaneously adjust both the toe-in and camber of a wheel. The ability to quickly and conveniently accurately alter both the camber and toe-in of a vehicle wheel with a simple shim would be especially desirable since it would tend to minimize the time required to align the wheel.

Accordingly, it would be highly desirable to provide improved shim apparatus which could be utilized to adjust either the toe-in or camber of a vehicle wheel and which could also be utilized to simultaneously adjust both the toe-in and camber of the wheel.

Therefore it is a principal object of the invention to provide apparatus for altering the alignment of the front and rear tires of a vehicle.

A further object of the invention is to provide shim apparatus which can be utilized to adjust either the toe-in or camber of a vehicle wheel and which can also be utilized to simultaneously adjust both the camber and toe-in of the wheel.

Another object of the invention is to provide improved shim apparatus of the type which is interposed between a spindle and associated axle member of a vehicle, the spindle normally rotatably carrying at least one of the wheels of the vehicle and being removably secured to the axle.

These and other, further and more specific objects and advantages of the invention will be apparent to those skilled in the art from the following detailed description thereof, taken in conjunction with the drawings, in which:

FIG. 3 is an exploded assembly perspective view of the sliding rule assembly utilized in conjunction with the chart board of FIGS. 1 and 2;

FIG. 4 is a top view of the dial utilized in the sliding rule assembly of FIG. 3 further illustrating construction details thereof;

Figure 1:
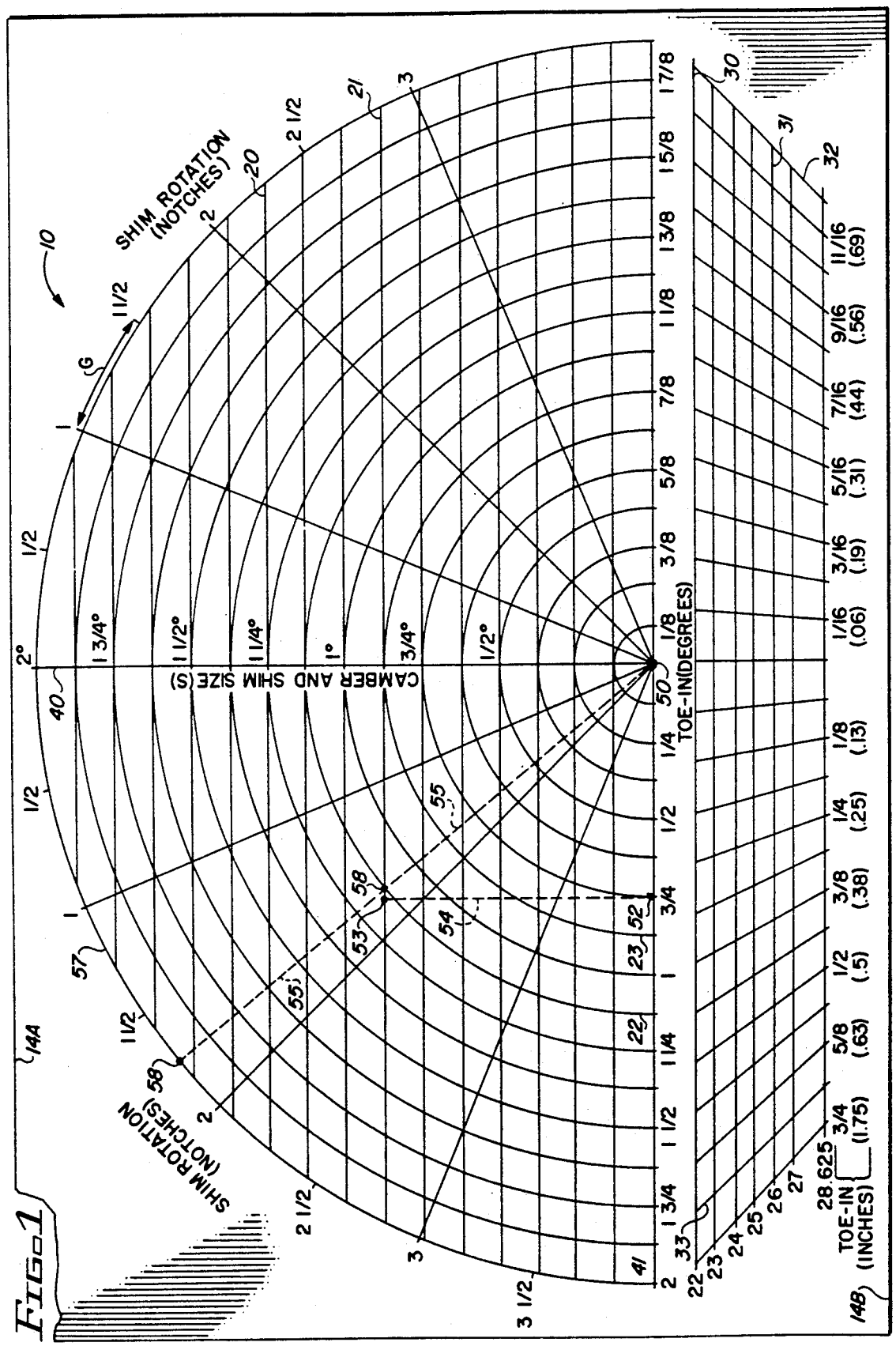
FIG. 1 is a top view illustrating a chart board constructed in accordance with the principles of the invention.

Briefly, in accordance with our invention, we provide orientation apparatus for selecting from a plurality of tapered shims at least one selected shim to be positioned in the wheel assembly of a vehicle to alter the alignment of the assembly by adjusting the camber and toe-in of the wheel assembly by selected amounts, and for determining the orientation of the selected shim necessary to alter the alignment of the wheel assembly by the selected amounts of camber and toe-in. The wheel assembly includes an axle member; spindle means attached to the axle member for rotatably receiving and carrying a wheel; and, bolts for removably, fixedly securing the spindle means to the axle member, the bolts each including at least one threaded end and each having an imaginary longitudinal centerline. Each of the tapered shims has a taper different from the taper of the other of the tapered shims and includes a first generally smooth contact surface lying in a first imaginary plane; a second generally smooth contact surface lying in a second imaginary plane, the second imaginary plane being at an angle with respect to the first plane, the first and second imaginary planes intersecting along a line and each being perpendicular to a third common imaginary plane; and at least one arcuate opening formed through the tapered shim. Each of the shims is interposable between the spindle means and the axle member in any of at least three operative positions to adjust the realignment of the wheel: a first operative position which adjusts the camber of the wheel; a second operative position which adjusts the toe-in of the wheel; and, a third operative position which simultaneously adjusts both the toe-in and camber of the wheel. The arcuate opening in each shim is shaped, contoured and dimensioned such that the bolts pass through the opening when the shim is interposed between the spindle means and the axle member and the bolts are utilized to fixedly secure the spindle means to the axle member; and, when the spindle means is, with the shim interposed therebetween, loosely secured to the axle member with the bolts, the shim can be rotated about an axis generally parallel to the longitudinal centerline of one of the bolts, and, between one of the first and second operative positions and the third operative position. The orientation apparatus includes chart means correlating camber and toe-in adjustment values with the orientation of each of the shims and including a first graduated axis indicating toe-in values; a second graduated axis perpendicular to the first graduated axis and indicating camber values, each of the values on the first and second axes representing a size of shim and representing the maximum amount by which the represented size shim can adjust the toe-in and camber of the wheel assembly, the toe-in and camber values increasing by selected increments as the distance along the axes from the intersection of the axes increases; and, arcuate alignment lines interconnecting equivalent values on the first and second axes. Each of the arcuate alignment lines indicates the amount by which the toe-in and camber of the wheel assembly is altered when a shim of the size represented by the equivalent values interconnected by the alignment line is interposed between the spindle and the axle of the wheel assembly in a selected position with respect to the bolts and to the axis generally parallel to the longitudinal centerline of one of the bolts. The orientation apparatus also includes dial means including an outer peripheral edge; a point of rotation on the dial means located intermediate the outer peripheral edge; a first rule line passing through the point of rotation; and, a second rule line passing through the point of rotation and perpendicular to the first rule line. The orientation apparatus also includes mounting means for mounting the dial means for movement in a first direction parallel to the first graduated axis, for movement in a second direction parallel to the second graduated axis, and for rotation about the point of rotation. The orientation apparatus permits a shim size to be selected by determining the desired toe-in and camber change of the wheel assembly of a vehicle; by moving the point of rotation of the dial means along the second graduated axis to the value on the second graduated axis corresponding to the desired toe-in value, by moving the point of rotation to a first reference position by moving the point of rotation away from the second graduated axis and parallel to the first graduated axis a distance equal to the distance from the second graduated axis of the value on the first graduated axis corresponding to the desired camber change; and, by selecting the one of the arcuate alignment lines closest to the first reference position, the selected arcuate line interconnecting equivalent values on the first and second graduated axes representing the size of shim selected. The orientation apparatus can permit the orientation of the selected shim size with respect to the bolts of the wheel assembly to be determined by rotating the dial means about the first reference position through the shortest arc required for both of the first and second rule lines to be colinear with a line passing through the point of rotation and the intersection of the first and second graduated axes.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a chart constructed in accordance with the principles of the invention and generally indicated by reference character 10. Chart 10 includes a first graduated horizontal axis 41 provided with toe-in values $\frac{1}{8}°$, $\frac{2}{8}°$, $\frac{3}{8}°$, etc. which increase as the distance from the intersection of axes 40 and 41 increase. The second graduated axis 40 is perpendicular to the first graduated axis 41 and is provided at selected increments with camber values $\frac{1}{8}°$, $\frac{2}{8}°$, $\frac{3}{8}°$, etc. which increase as the distance along axis 40 from the intersection 50 of axes 40 and 41 increases. Each value $\frac{1}{8}°$, $\frac{2}{8}°$, $\frac{3}{8}°$, etc. along an axis 40 or 41 also indicates the size of a shim. For example, the $\frac{1}{8}°$ graduation or point on the axis 40 (or 41) indicates a shim which has a taper angle A (FIG. 9) of $\frac{1}{8}°$ and which will, accordingly, adjust either the toe-in or camber of a wheel assembly by a maximum amount of $\frac{1}{8}°$. A plurality of arcuate semicircular alignment lines interconnect equivalent values on the first and second graduated axes 40, 41. For example, arcuate alignment line 22 interconnects the equivalent values $1\frac{1}{8}°$ on axes 40 and 41; and, semicircular alignment line 23 interconnects equivalent values $\frac{7}{8}°$ on axes 40 and 41. Each of the alignment lines indicates the amount by which the toe-in and camber of the wheel assembly is altered when a shim of the size represented by the equivalent values interconnected by the alignment line is interposed between the spindle and the axle of the wheel assembly in a selected position with respect to either the bolts or to a vertical reference line on the axle (or the spindle). The selected position of a shim on the bolts is achieved by rotating the shim with respect to the bolts. The shim is rotated about an axis which is generally parallel to the longitudinal centerline of one of the bolts and is perpendicular to the face of the axle and to a vertical reference line (line Y in FIG. 7) passing through the face of the axle. To facilitate the use of chart 10, horizontal lines are provided which pass through each incremental camber value (and shim size value) on axis 40. For example, horizontal line 20 passes through the incremental camber value (and shim size) 1 ¼° on axis 40. Horizontal line 21 passes through incremental camber value (and shim size) ⅞° on axis 40.

As will be described, in order to select a proper shim size and to determine the proper orientation of the shim on the axle, desired camber and toe-in values are first determined. In the event the desired toe-in value is in degrees, then graduated axis 41 is utilized. In the event the toe-in is given in inches, then the diameter of the wheel or tire is determined and one of the alternate graduated axes 30, 31, etc. beneath axis 41 is utilized. For example, if the tire diameter is twenty-two inches, then alternate 30 is utilized.

In determining the value along each arcuate semicircular alignment line in chart 10 the following formula is used:

$$\tan^2 (\text{theta}) = \sin^2 (\text{sigma}) + \sin^2 (\text{gamma}) \qquad [1]$$

Theta is the angle A (FIG. 9) or the size or taper of the shim in question. Sigma is the camber change in degrees. Gamma is the toe-in change in degrees.

Formula [1] is utilized in conjunction with the below formula [2] to determine the size of shim and the orientation of the shim for desired toe-in and camber adjustment values.

$$\cos (\text{phi}) = \sin (\text{sigma}) / \sin (\text{theta}) \qquad [2]$$

Phi is the shim rotation in degrees required to obtain a desired toe-in and camber change. For example, if a 1° camber and a 0.4° toe-in change are required, then substitution into the equations [1] and [2] yields a shim angle theta of 1.076° and a shim rotation phi of 21.6°. We see, therefore, that any combination of camber and toe-in change can be achieved, but a large number of shim sizes would be required. Since it is impractical to manufacture a large number of shim sizes, the exact desired camber and toe-in adjustments cannot always be achieved. The installer can therefore make a compromise when installing a shim. If he chooses toe-in as the change that must be exact, then the camber will be allowed to float and be approximated within a narrow range of deviation. He could, of course, choose the camber as the exact adjustment to be achieved and permit the toe-in adjustment to float within a narrow range, or he could approximate both the toe-in and camber adjustment values. If he selects a group of shims sized to increase incrementally by ⅛° from a base shim size of ¼°, as is the case in chart 10, he will have in the group shim sizes or tapers of 1° and 1⅛°. Since 1.076 is closer to 1⅛° than 1°, the former shim size is selected. He consequently has two of the four parameters of the shim selector equations [1] and [1] from which the actual camber change and shim rotation can be determined. The installer therefore gets:

| | |
|---|---|
| Shim angle (shim size) theta | = 1⅛° |
| Toe-in change gamma (exact) | = 0.4° |
| Camber change sigma (approx.) | = 1.05° |
| Shim rotation phi to achieve gamma of 0.4° and sigma of 1.05° | = 20.8° |

Similar results are obtained if the camber is held constant and the toe-in is approximated or allowed to "float".

Figure 2:
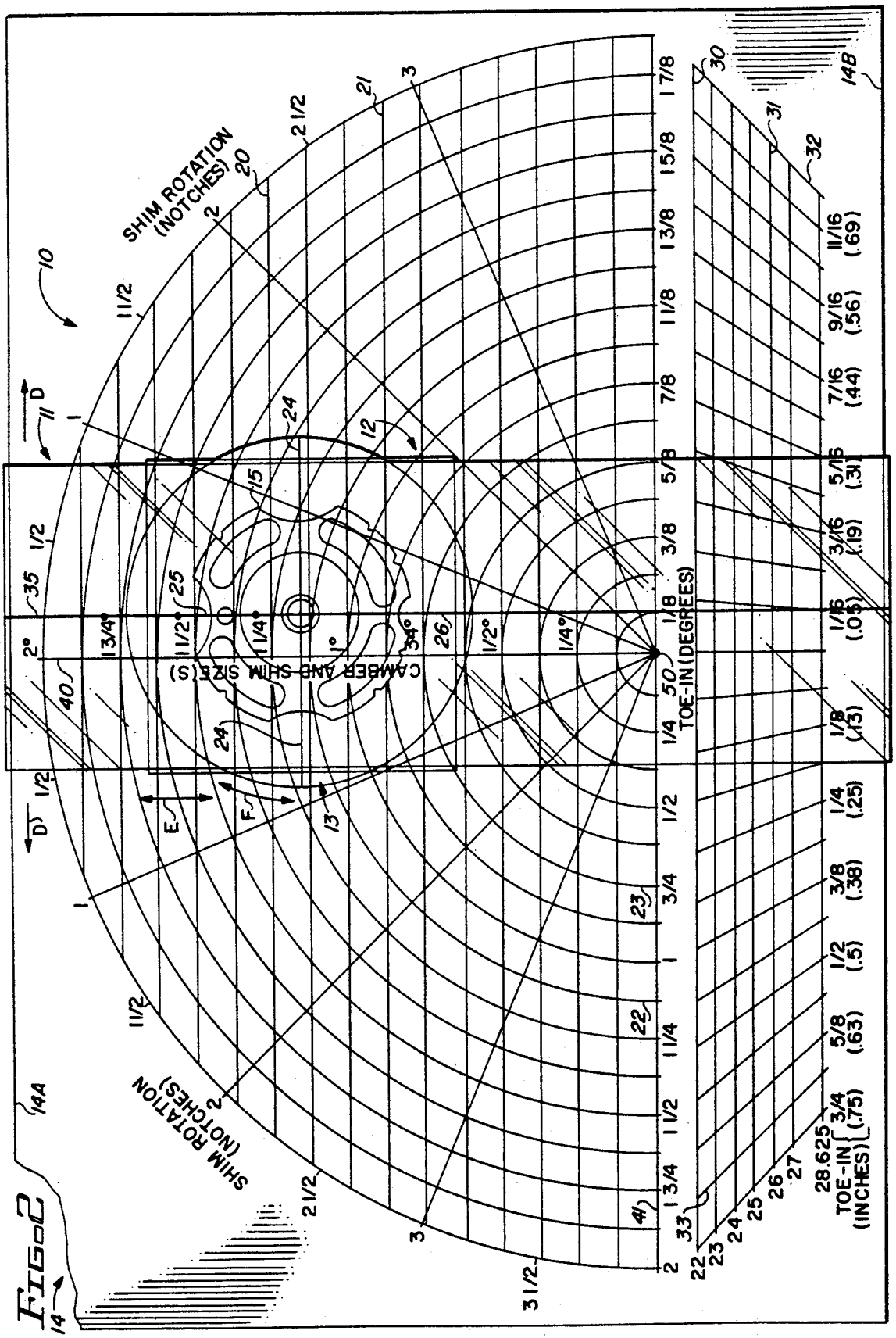
FIG. 2 illustrates the chart of FIG. 1 equipped with a sliding rule assembly utilized in conjunction with the chart board to select and orient a shim to provide desired camber and/or toe-in corrections.

FIGS. 2, 3 and 4 illustrate the dial and mounting slides utilized in conjunction with chart 10. The graduated axes 40 and 41, the arcuate alignment lines 22 and 23, etc.; the alternate horizontal graduates axes 33, etc. beneath axis 41; and, the various other lines comprising chart 10 are inscribed or otherwise imprinted or affixed to a rectangular panel 14 having upper and lower parallel edges 14A and 14B. Elongate slide 11 is fabricated from a clear plastic and includes ends 11A and 11B having elongate U-shaped slots which slidably engage edges 14A and 14B, respectively, and permit slide 11 to be moved along panel 14 in the directions of arrows D. Slide 12 is fabricated from a clear plastic and includes edge members 12A and 12B which each have an elongate U-shaped slot which slidably engages edges 11C and 11D, respectively, of slide 11 and permit slide 12 to be moved along slide 11 in the directions of indicated by arrows E. Aperture 17 formed through slide 12 receives rivet or sleeve 14 which extends through aperture 16 in dial 13 and rotatably affixes dial 13 to slide 12. Dial 13 rotates about aperture 17 in the directions indicated by arrows F. Dial 13 is fabricated from clear plastic. First rule lines 25 and 26 are formed in the face of dial 13 and are colinear. Second rule lines 24 are formed on the face of dial 13, are colinear, and are perpendicular to ruled lines 25 and 26. Aperture 16 lies within and intermediate the outer peripheral edge 13A of dial 13. To facilitate the use of dial 13, the design 15 of a shim is inscribed on the face of dial 13.

The following example is given to illustrate the use of chart 10 in conjunction with a shim to align the axle of a vehicle. The desired camber and toe-in adjustment values are determined for the right front wheel of a vehicle. The right front wheel is the wheel on the right hand side of a driver seated in the vehicle. Methods for obtaining the desired toe-in and camber adjustment values of a wheel are well known in the art and will not be discussed herein. It is assumed that the desired toe-in adjustment is ⅜° in and the desired camber adjustment is a positive camber adjustment of ⅞°. Since the desired camber adjustment is positive or out, rule line 25 is positioned above line 26 and parallel to axis 40 in the manner depicted in FIG. 4. The instruction 51A on dial 13 in FIG. 4 explains this positioning of line 25. If the desired camber adjustment had been negative or in, then the line 26 would have been positioned above line 25 in FIG. 4, i.e., the shim in FIG. 4 would have been rotated 180° about an axis perpendicular to the plane of the sheet of paper of the drawing and passing through rivet 14. When dial 13 is positioned as shown in FIG. 4, dial 13 indicates that the thickest portion of a tapered shim 60 is positioned above dial 13 at the top at point 13T while the thinnest portion of the shim is positioned above dial 13 at the bottom at point 13B in FIG. 4. When the shim of FIG. 4 is rotated 180° to position line 26 above line 25 in FIG. 4, then the thinnest portion of a shim 60 positioned above dial 13 at point 13B while the thickest part of the shim would be positioned at point 13B. A shim 60 can, but need not be, positioned above dial 13 while the adjustment of dial 13 and slides 11 and 12 are made. In FIG. 2, the rivet 14 is centered on the intersection point 50 of the axes 40 and 41. The second rule lines or camber lines 24 are aligned with axis 41. As noted in FIG. 4, the inscription 51 on dial 13 instructs that when the right side toe is to be adjusted in, then the dial 13 is slid to the left of intersection point 50. Accordingly, slide 11 is slid along edges 14A and 14B to move rivet 14 from intersection point 50 to the left until rivet 14 is centered on point 52. Point 52 represents a toe-in adjustment of ¾°. When rivet 14 is centered on point 52, lines 24 are still colinear with axis 41. After rivet 14 is centered on point 52, slide 12 is moved upwardly along slide 11 such that rivet 14 tracks along centerline 35 inscribed on slide 11. Slide 12 is moved upwardly along a line indicated by dashed line 54 in FIG. 1. Line 54 is colinear with centerline 35. The orientation of centerline 35 represents the orientation of line Y in FIG. 7. Slide 12 is moved until rivet 14 is centered on reference point 53. Reference point 53 lies along the horizontal line 21 which passes through the ⅞° graduation mark on axis 40. The ⅞° graduation mark on axis 41 corresponds to the desired ⅞° camber change. Slide 11 is slide along edges 14A and 14B in one of the directions indicated by arrow D to center rivet 14 on the arcuate alignment line closest to reference point 53. In this example, arcuate alignment line 22 is closest, and rivet 14 is centered on point 58. Point 58 represents the intersection of alignment line 22 and the horizontal line which passes through the ⅞° graduation of axis 40. While rivet 14 remains centered on reference point 58, dial 13 is rotated about rivet 14 and aperture 17 to point first rule line 26 toward point 50 such that first reference lines 25 and 26 are colinear with dashed line 55 in FIG. 1. Dashed line 55 passes through point 50 and reference point 58 and intersects the outermost semicircular arcuate line of chart 10 at point 58. Point 58 indicates that the shim selected, the 1⅛° shim, needs to be rotated about 1¾notches to achieve the proper orientation to closely approximate desired ¾° toe-in change and ⅞° camber change. In FIGS. 1 and 2, the "SHIM ROTATION (NOTCHES)" graduations numbered ½, 1, 1½, 2, 2½, 3, 3½ along arcuate alignment line 57 indicate 11.25° increments of rotation of a shim. In FIG. 1, arrows G indicates an arc of rotation of 11.25° from the "1" notch to the "1 ½" notch points along arcuate alignment line 57. In the foregoing example, the thicker portion of the shim is positioned toward the top of chart 10. Accordingly, in FIG. 1 the graduation "2" to the left of axis 40 along line 57 can be thought of as corresponding to notch 79 of the shim of FIG. 8. The chart of FIG. 1 assumes that notches 1, 2, 3, etc. are formed on the periphery of a shim 88 at 22.5° intervals. The shim of FIGS. 7 to 10 is illustrated with equally spaced notches 66 to 88 formed at 15° intervals.

Continuing with the foregoing example, after the user has determined that a 1⅛° shim is appropriate and needs to be rotated about 1¾notches (or about 2.6 of the notches in FIG. 8) the user removes the spindle from the axle, and places 1⅛° a shim on the bolts which interconnect the spindle and axle. The shim is initially placed on the axle with the thickest part of the shim up i e., the shim initially is in a position which is rotated 180° from the position of the shim illustrated in FIG. 7, and rotates the shim 1¾notches in the counterclockwise direction to position the shim on the bolts so the shim will adjust the right front tire toe-in inward by ¾° and will adjust the right front tire camber in a positive (out) direction by ⅞°. The spindle is then bolted securely to the axle.

In an alternate procedure, once the user has utilized chart 10 to determine that a 1⅛° shim is necessary and must be rotated 1¾notches, the user can take a 1⅛° shim and place orientation which conforms to that of the shim 15 drawn on the dial. When the 1⅛° shim is placed in the orientation of the shim 15 on the dial, the thickest portion of the 1⅛° shim is near point 58, and the thinner portion of the 1⅛° shim is nearer point 50 and intermediate the thickest part of the shim and point 50. In other words, the orientation of the 1⅛° shim with respect to axis 40 duplicates the necessary orientation of the shim on axle 91 with respect to vertical axis Y. When the 1⅛° shim is so positioned on top of dial 13, a transfer mark is made on the periphery of the upper portion of the shim immediately adjacent reference line 35 of slide 11. The 1⅛° shim is then placed on the bolts 92 to 95 (FIG. 7) of the axle 91 such that the transfer reference mark made on the periphery of the upper portion of the shim is positioned immediately adjacent a vertical reference line Y (or an appropriate reference point) drawn on the face of axle 91. The transfer reference mark made on the periphery of the 1⅛° shim facilitates the placing of the shim on bolts 92 to 95 in the correct orientation.

As utilized herein, the term spindle is intended to encompass any component(s) which rotatably carry the wheel of a vehicle and which is detachably fixedly secured to an axle member(s). The shim of the invention is shaped, contoured and dimensioned as necessary to be interposed between the spindle and its associated axle member such that it can, at some time before the spindle is securely attached to the axle member, be rotated to adjust camber and toe-in. Other components or shim means may or may not, as desired, be interposed with the shim of the invention between the spindle and its associated axle member. Thus, the shim of the invention may be utilized between pads 26, 30 of FIG. 2 of U.S. Pat. No. 4,037,680 to Grove or may be utilized between the "stub axle" and "axle beam" illustrated in FIG. 5.1 on page 21 of *Section 3: Suspension and Steering* of Robert Bentley's "Rabbit/Scirocco Service Manual, 1980 Gasoline Models Including Pickup Truck", 1980, Library of Congress Catalogue Card No. 79-57284.

Figure 10:
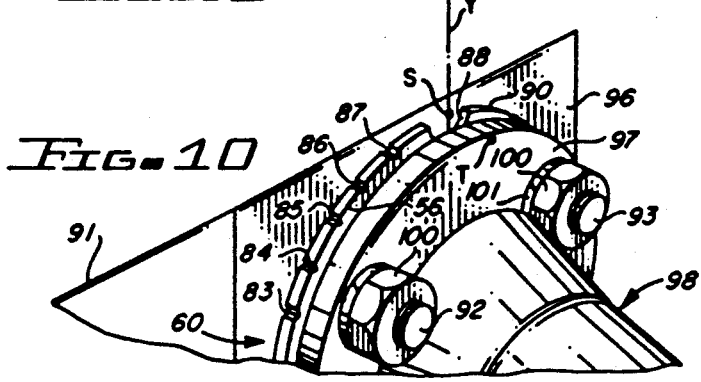
FIG. 10 is a top view illustrating yet another embodiment of the shim utilized in the practice of the invention.

A shim 60 constructed in accordance with another embodiment of the invention is illustrated in FIGS. 7-10. Shim 60 includes central circular aperture 61 formed therethrough, slots 62 to 65, and notches 66–87 formed in the outer peripheral edge 90 of shim 60. Notches 66–87 are formed at 15° intervals about the circumferential periphery 90 of shim 60. Planar contact faces or surfaces 56, 57 of shim 60 are skewed and at an acute angle with respect to one another at the angle of A degrees indicated in FIG. 9. The planes passing through surfaces 56 and 57 are, in FIG. 9, perpendicular to the plane of the sheet of paper of the drawings. Base 97 of wheel spindle 98 includes apertures 99 formed therethrough to receive bolts 92-95 passing through slots 62-65 formed in shim 60. As shown in FIG. 10, after shim 60 is sandwiched between base 97 of spindle 98 and surface 96 of axle member 91, nuts 100 and washers 101 are used to secure spindle 98 and shim 60 in position against axle member 91. The bottom surface 102 of spindle 98 is planar and would, if shim 60 were not interposed between spindle 98 and axle member 91, bear against and be generally parallel to surface 96 of axle member 91 when spindle 98 was bolted in position against member 91.

Figures 8, 9:
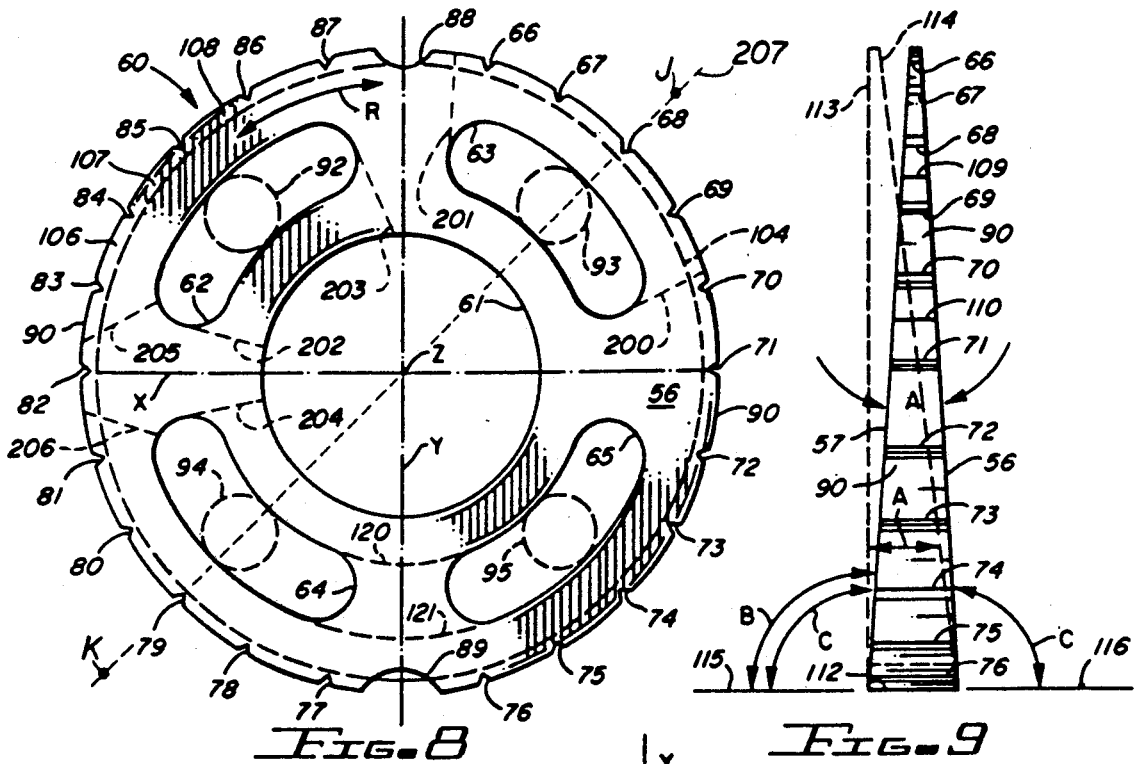
FIG. 8 is a top view of still another embodiment of the shim utilized in the practice of the invention.
FIG. 9 is a side view illustrating the shim of FIG. 8.

When shim 60 is sandwiched between spindle 98 and base 97 of axle member 91 in the orientation shown in FIG. 10, i.e., with semicircular notches 88, 89 centered along an imaginary vertical reference line or axis Y, then only the camber of spindle 98 and of a tire mounted on spindle 98 is adjusted. If the shim of FIG. 8 is rotated 90° about an imaginary axis perpendicular to surface 96 and passing through the imaginary reference centerline or axis Z of shim 60, then semicircular grooves 88, 89 would be centered on imaginary horizontal reference line or axis X. When shim 60 in FIG. 10 is positioned with grooves 88, 89 centered on horizontal axis X, then shim 60 is only adjusting the toe-in of a tire mounted on spindle 98.

When shim 60 is loosely positioned between spindle 98 and axle member 91 in the orientation illustrated in FIG. 10, bolts 92-95 are positioned in slots 62-65 as indicated by dashed circles 92-95 in FIG. 8. Since, as shown in FIG. 8, bolts 92-95 are essentially centered along slots 62-65, shim 60 can be rotated in the directions indicated by arrows R. After shim 60 is rotated to a desired position, nuts 100 are completely tightened to secure base 97 and shim 60 against axle member 91.

In FIG. 8 dashed line 104 indicates the position of the circumference of base 97 when base 97 is secured against shim 60 and axle member 91 as indicated in FIG. 10. The diameter and circumference of shim 60 are slightly greater than the diameter and circumference of base 97 so that the peripheral edge of shim 60 extends outwardly past base 97 of spindle 98. This permits a mechanic to readily grasp outer edge 90 and rotate shim 60 when shim 60 is loosely positioned between spindle 98 and axle member 91.

As would be appreciated by those of skill in the art, once the angle of taper A between faces 56, 57 of shim 60 is determined, well-known mathematical equations can be utilized to calculate how much the camber and/or toe-in of spindle 98 and of a wheel carried on spindle 98 will be altered when shim 60 is in a particular orientation between spindle 98 and axle member 91. As earlier noted, when semicircular notches 88, 89 are centered on imaginary vertical axis Y, only the camber of a wheel carried on spindle 98 is altered. When shim 60 is positioned between spindle 98 and axle member 91 such that notches 88, 89 are centered on imaginary horizontal axis X, then only the toe-in of a wheel carried on spindle 98 is altered. If, when shim 60 is positioned between spindle 98 and axle member 91, notches 88, 89 are not centered on imaginary vertical axis Y or horizontal axis X, then both the toe-in and camber of a tire carried on spindle 98 are adjusted.

After shim 60 is inserted between spindle 98 and axle member 91 in the base position indicated in FIG. 10, a reference point S or T is marked on axle member 91 or spindle 98 along imaginary vertical axis Y. An appropriate reference point could be marked along horizontal axis X or at any other desired point on spindle 98 or axle member 41. Shim 60 could initially be positioned between spindle 98 and axle member 91 in a variety of base or beginning orientations other than the orientation shown in FIG. 10. In FIG. 10 semicircular notch 88 is centered and aligned on reference points S and T.

When shim 60 is initially loosely positioned between spindle 98 and axle member 41 in the base position shown in FIG. 10 and is then rotated in one of the directions indicated by arrows R, notches 66-87 and reference points S and T make it a relatively easy matter for a mechanic to determine the length of the arc through which shim 60 has been rotated. For example, if after rotating shim 60 clockwise from its base position of FIG. 10 notch 87 is in line with reference points S and T, then shim 60 has been rotated clockwise from its base position through an arc of 15°. If notch 86 is aligned with reference points S and T then shim 60 has been rotated from its base position of FIGS. 8 and 10 through an arc of 30°.

In FIG. 9 faces 56, 57 and base line 112 generally form an isosceles triangle. Faces 56, 57 and base 112 can generally form any other type of triangle. For example, base 112 and the shim faces represented by dashed lines 113, 114 represent a shim which forms a right triangle. Lines 112, 115, 116 in FIG. 9 are colinear. Angle B between lines 113 and 115 is 90°. Angles C between lines 115 and 57 and lines 116 and 56 are equal to one another and are each greater than 90°.

In utilizing the shim illustrated in FIGS. 7-10, it is anticipated that a mathematical table would, although not necessary, be prepared from which a mechanic could easily determine the amount by which the camber and/or toe-in of a tire would be altered when shim 60 was interposed between spindle 98 and axle member 41 and rotated to a particular position. The mathematical table would recite the amount the camber of the tire is altered when semicircular groove 88 is centered on imaginary vertical axis Y and would recite the amount camber and/or toe-in are altered when notches 66-87 are aligned with reference points S and T. In using the mathematical table and shim 60 to adjust the alignment of a tire, a mechanic would first determine how much he wished the camber and toe-in of the tire to be adjusted; refer to the mathematical table to determine which position shim 60 should be in in order to achieve the desired adjustment of camber and/or toe-in (i.e., to determine which notch 66-87 or groove 88, 89 should be aligned with reference points S and T and imaginary vertical axis Y); remove the tire from the spindle; loosely position shim 60 between spindle 98 and axle member 41 as indicated in FIG. 10; rotate (if necessary) shim 60 to the position indicated by the mathematical table in order to obtain the desired adjustment of camber and/or toe-in; completely tighten bolts 100 to fixedly secure spindle 98 and shim 60 in position against axle member 91; and, remount the tire on spindle 98.

If a right angle shim 60 having a side view similar to that indicated by lines 113, 114, 112 in FIG. 9 and having a taper angle A of 0.25° were being utilized to align a tire, the change in the angle of camber and toe-in of the tire for a given orientation of the shim can be determined from the following mathematical table:

TABLE 1

| Change in Camber and Toe-in Caused by Shim Having 0.25° Taper Angle | | |
|---|---|---|
| Length of Arc Clockwise Rotation of Shim 60 from Base Position Shown in FIG. 10 (degrees) | Resultant Change in Camber Caused by Shim 60 (degrees) | Resultant Change in Toe-in Caused by Shim 60 (degrees) |
| 0 | −.25 | 0 |
| 15 | −.2083 | −.0417 |
| 30 | −.1667 | −.0833 |
| 45 | −.125 | −.125 |
| 60 | −.0833 | −.1667 |

TABLE 1-continued

Change in Camber and Toe-in
Caused by Shim Having 0.25° Taper Angle

| Length of Arc Clockwise Rotation of Shim 60 from Base Position Shown in FIG. 10 (degrees) | Resultant Change in Camber Caused by Shim 60 (degrees) | Resultant Change in Toe-in Caused by Shim 60 (degrees) |
| --- | --- | --- |
| 75 | −.0417 | −.2083 |
| 90 | 0 | −.25 |
| 105 | .0417 | −.2083 |
| 120 | .0833 | −.1557 |
| 135 | .125 | −.1250 |
| 150 | .1667 | −.0833 |
| 165 | .2083 | .0417 |
| 180 | .25 | 0 |

Shims 60 can be provided in which the taper angle A in some of the shims differs from the taper angle A in others of the shims. If desired two or more shims can be stacked between spindle 98 and axle member 41.

Engravings or other types of marks 106-110 can be formed on the peripheral edge of shim 60 in place of or in addition to notch marks 66-87. The circumference and diameter of shim 60 does not have to be greater than the circumference and diameter of base 97 of spindle 98.

Shim 60 can be fabricated so that the material between grooves can be snapped out, cut away, or otherwise removed in order to increase the length of the grooves. For example, in FIG. 8 shim 60 could be die cut along dashed lines 120, 121 so the piece of shim material bounded by lines 120, 121 could be manually snapped from shim 60. Shim 60 could also be cut along lines 201 and 200 so groove 63 would open outwardly; could be cut along lines 202 and 203 so groove 62 would open inwardly; and, could be cut along lines 202, 204, 205, 206 to form an open area in shim 60 interconnecting slots 62 and 64.

Figure 5:
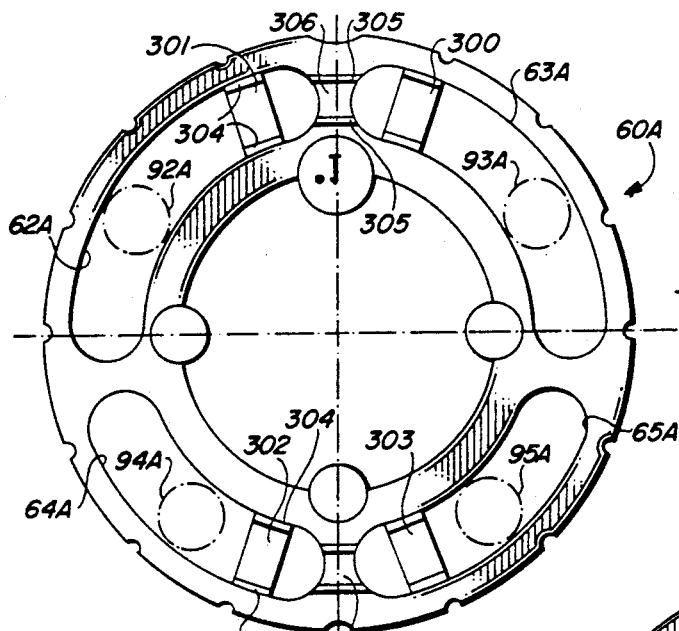
FIG. 5 is a top view of one embodiment of the shim utilized in the practice of the invention.

FIG. 5 illustrates a tapered shim 60A which can be utilized in the practice of the invention. Bolts 92A to 95A of the wheel axle extend through arcuate slots 62A to 65A. Knockout members 300 to 303, 305, 330 are formed in shim 60A. Lines of weakening permit these knockout members to be readily snapped or pried free from the body of the shim. For example, die cut lines or lines of weakening 304 bound knockout 301 and lines of weakening 305 bound knockout 306. Lines of weakening 304 and 305 are readily snapped or severed to remove a knockout 301, 305.

Figure 6:
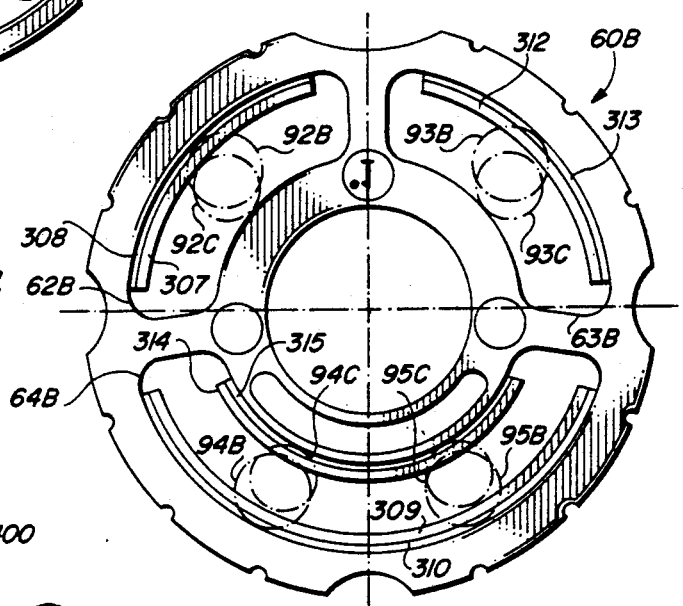
FIG. 6 is a top view of another embodiment of the shim utilized in the practice of the invention.

FIG. 6 illustrates another tapered shim 60B which can be utilized in the practice of the invention. Bolts 92C to 95C of the wheel axle extend through arcuate slots 62B, 63B and 64B. Arcuate knockout ribs 307, 309, 312 and 314 are formed in shim 60B. Lines of weakening permit these knockout members to be readily snapped or pried free from the body of the shim to enlarge slots 62B to 64B. Die cut lines of weakening 308, 315, 310, 313 separate knockouts 307, 314, 309 and 312, respectively, from the body of the shim. When knockout ribs 307, 309, and 312 are snapped free from the shim, the slots 62B to 64B are enlarged and will accept larger diameter bolts 92B to 95B. Bolts 92B to 95B have a larger outer diameter than bolts 92C to 95C.

Figure 11:
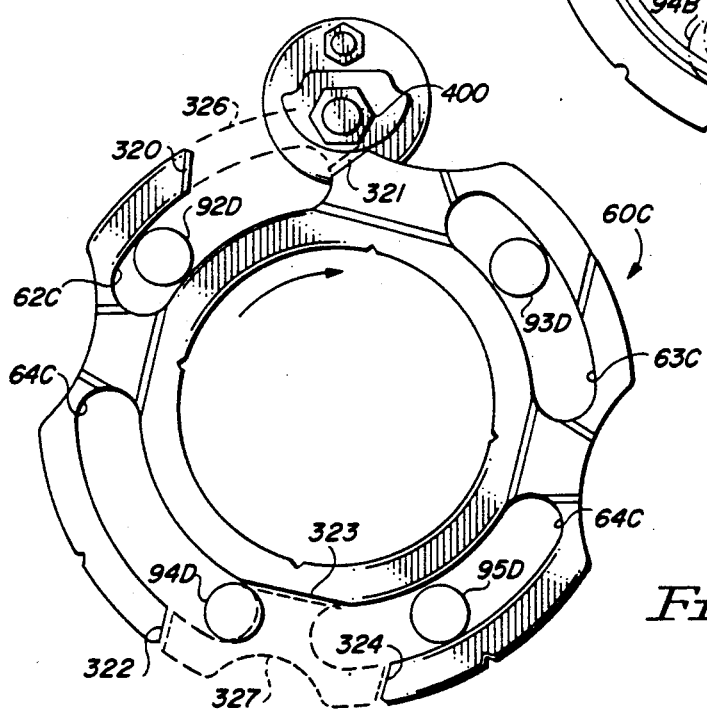
FIG. 11 is a top view of yet another embodiment of the shim utilized in the practice of the invention.

FIG. 11 illustrates another tapered shim 60C which can be utilized in the practice of the invention. Bolts 92D to 95D of the wheel axle extend through arcuate slots 62C to 64C. Lines of weakening formed in the shim 60C permit the portions of the shim to be removed to permit the shim to be rotated past a brake line 400 or other obstacle in the wheel assembly. For example, in FIG. 11, portion 326 has been removed from the shim 60C by severing the shim along lines of weakening 320 and 321. Portion 327 has been removed from shim 60C by severing the shim along lines of weakening 322 to 324.

Figure 7:
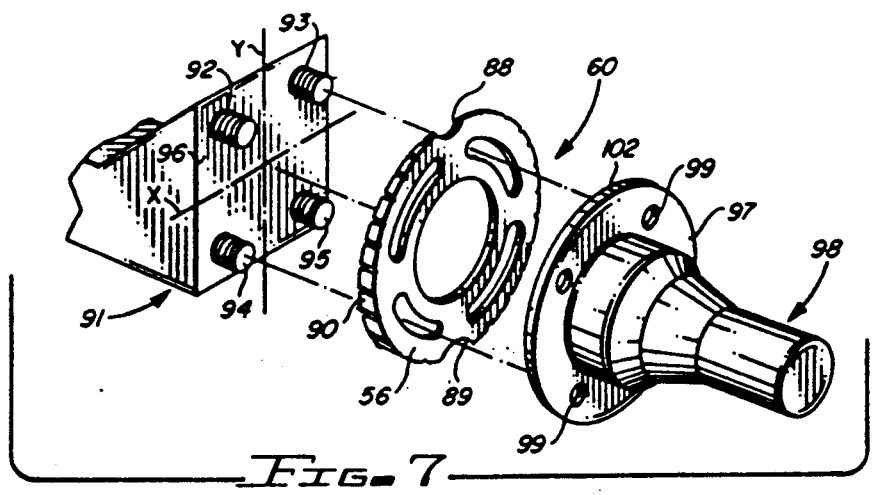
FIG. 7 is an exploded perspective view illustrating the positioning of a shim of the invention intermediate the spindle and axle of a vehicle.
Figure 12:
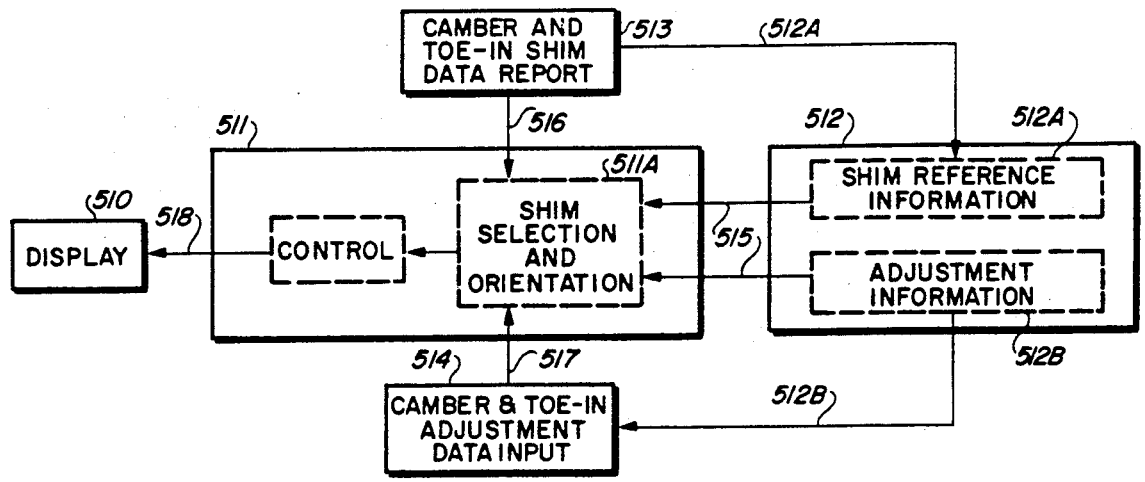
FIG. 12 is a block diagram illustrating an improved shim selection and orientation system embodying the present invention; and, FIG. 13 is a block diagram which illustrates a typical program or logic function utilized in accordance with the embodiment of the invention in FIG. 12.

FIG. 12 is a block diagram which illustrates a computerized embodiment of the shim selection and orientation system of the invention, the main components of which are a display system 510, a controller 511, and a memory 512. A camber and toe-in shim data input 513 and a camber and toe-in adjustment data input 514 are provided. The controller 511 performs the function of shim selection and orientation 511A. The memory 512 contains both shim reference information 512A and adjustment information 512A. The shim reference information 512A is comparable to chart 10 and/or to Table 1 herein and provides the toe-in and camber adjustment which can be provided for each of a plurality of different sized shims when the shim is in any of a plurality of different orientations or positions with respect to vertical reference line Y (FIG. 7). In other words, the shim reference information is comparable to the arcuate alignment lines 22, 23, etc. of chart 10, or to linear alignment line information of the type shown in Table 1: Change in Camber and Toe-in Caused by Shim Having 0.25° Taper Angle. The shim reference information 512A can also include the earlier described formulas [1] and [2] to permit the controller 511 to calculate the ideal shim size and orientation to produce a desired camber and toe-in adjustment. Once the controller calculates the ideal shim size, it can select the closest shim size available based on the shim data in memory in shim reference information 512A. The adjustment information 512B includes the desired positive and negative camber and toe-in adjustments for a particular tire (right front, left front, etc.) and tire size on a vehicle. After the shim reference information 512A and adjustment information 512B are stored in memory 512, the controller, in the manner just described, selects the size shim and orientation of the selected shim which most closely approximates the desired camber and toe-in adjustments. The controller 511 essentially performs the same function performed by using chart 10 to determine which of the available shim sizes most closely approximates a desired camber and toe-in adjustment. Once the controller 511 has selected a shim, the controller produces control signals 518 to cause the display 510, which can be a CRT or printer or other display means, to show the size and orientation of the shim selected by the controller. The CRT presently shows an illustration of the selected shim and indicates the orientation of the shim. The illustration of the shim shown on the screen of the CRT is a "front" view illustration of the shim like that seen on FIGS. 5, 6, 8 and 11 herein. The "front" view illustration of the shim shows one of the planar faces (like planar face 56 in FIG. 8) of the shim and also indicates the location of the thinnest and the thickest points of the shim along with the axis about which the shim is rotated. In FIG. 8, the thinnest point of the shim is indicated by groove 88 while the thickest point on the shim is indicated by groove 89. Axis Z is the reference axis about which shim 60 is rotated when the shim is in the position shown in FIG. 7. Axis Z is parallel to he longitudinal axes of bolts 92 to 95 and passes through the imaginary centerpoint of shim 60 in FIGS. 7 and 8. If shim 60 appears on the screen of the CRT in the orientation shown in FIG. 8, then the user knows that the shim is to be installed with the thinnest point on the shim lying along vertical reference line Y so that the shim 60 only adjusts camber and not toe-in. In FIG. 8, vertical reference line or axis Y coincides with the line which connects the thinnest and thickest portions of the shim 60. If, on the other hand, shim 60 appears on the screen of the CRT rotated 45° clockwise from the position shown in FIG. 8, then the line which interconnects the thickest and thinnest parts of shim 60 is indicated by dashed line 207 and a user determines the orientation of the tapered shim he is actually using by placing the shim over the illustration on the screen of the CRT, by rotating the shim he is using clockwise until the thickest and thinnest portions of the shim coincide with line 207 (with the thinnest part of the shim between one o'clock and two o'clock and the thickest part of the shim between seven o'clock and eight o'clock), and by marking the shim at a point on the periphery of the shim coinciding with vertical reference line Y. Both vertical reference line Y and dashed line 207 appear on the CRT. After the user marks the shim he is using at the point on the periphery of the shim which coincides with reference line Y, then the user places the shim 60 on bolts 92 to 95 (after the spindle 98 is removed from the bolts and axle member 91) such that the mark on the periphery of the shim aligns with vertical reference line Y in FIG. 7. Consequently, as demonstrated by the foregoing discussion, a user can use the illustration on the CRT screen of the selected shim in its proper position in order to orient and mark the tapered shim he is actually using so the tapered shim can be properly rotated about reference axis Z and positioned on bolts 92 to 95.

As would be appreciated by those of skill in the art, reference line Y can be indicated by a single point marked on axle member 91. Reference line Y can be indicated on the screen of the CRT by a single point or a number of co-linear points. Reference line 207 can be indicated by a point on the periphery of shim 60 or by another point(s) appearing on the screen of the CRT. For example, points J, K (FIG. 8) shown on the screen of the CRT on shim 60 which represented the thickest and thinnest parts of shim 60 would be equivalent to dashed line 207. In FIG. 8, grooves 88 and 89 indicate the thickest and thinnest portion of shim 60 and indicate the location of line 207 when shim 60 is in the orientation shown in FIG. 8. When shim 60 is in the position shown in FIG. 8, line 207 coincides with reference axis Y.

While a vertical reference line Y is utilized in the foregoing examples, a reference line on axle member 91 having any desired orientation can be selected.

Figure 13:
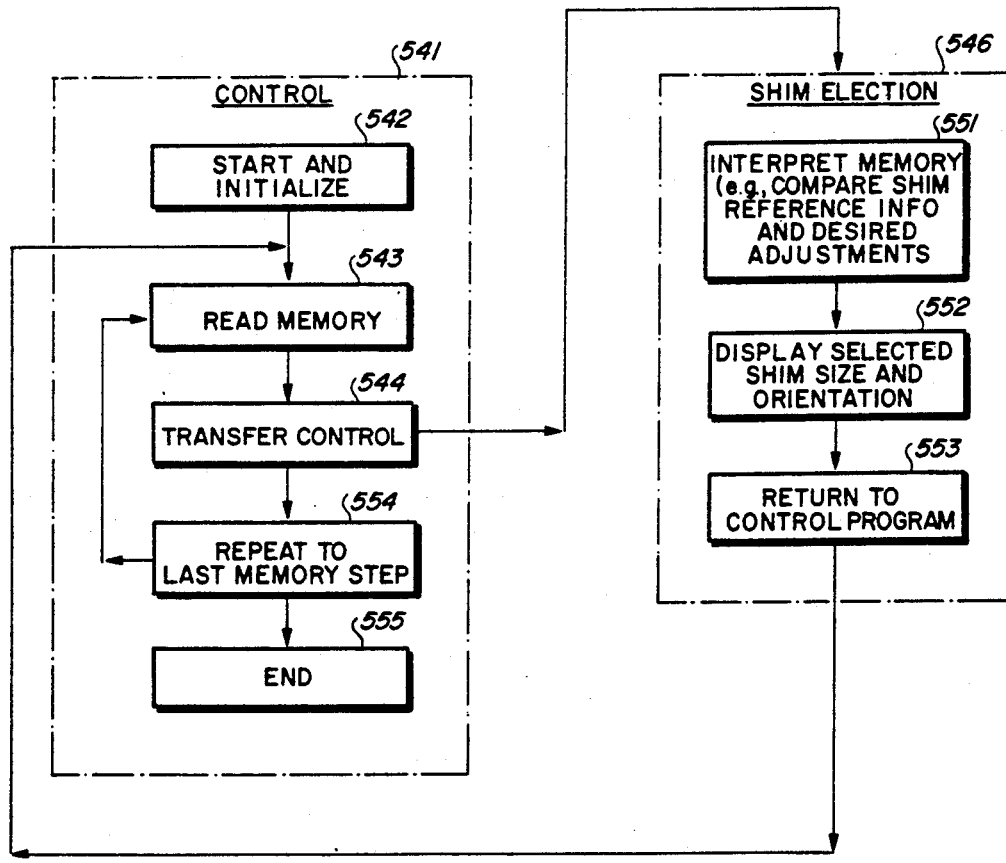

FIG. 13 is a block flow diagram which illustrates a typical program or logic function which is executed by the controller 511 for selecting and orientating a shim for a desired camber and toe-in adjustment. The basic control program 541 consists of commands to "start and initialize" 542, "read memory" 543, and "transfer control" 544 to the shim selection sub-routine.

The shim selection sub-routine 546 consists of commands to interpret memory 551 (i.e., compare the desired camber and toe-in values with the shim reference information to select and determine the orientation of a shim), display the selected shim size and orientation 552, and return to control program 553 which completes the execution of the program.

The control program 541 and the shim selection sub-routine are repeated as indicated by the "repeat to last memory step" 554 of the control program 541 followed by "end" program step 555 which completes the execution of the program.

In FIG. 9, a first imaginary plane perpendicular to the plane of the paper of the drawing passes through planar face 57 of shim 60. A second imaginary plane perpendicular to the plane of the paper of the drawings passes through planar face 56 of shim 60. These first and second imaginary planes intersect along a line and are at an acute angle A with respect to one another. This acute angle A represents the taper or "size" of shim 60 and represents the maximum amount by which shim 60 can alter the camber or the toe-in of the wheel assembly of a vehicle. Both the first and second imaginary planes are perpendicular to a third imaginary plane which is parallel to and coplanar with the plane of the paper of the drawings.

Having described my invention in such terms as to enable those skilled in the art to understand and practise it, and having identified the presently preferred embodiments thereof, We claim:

1. Orientation apparatus for
   selecting from a plurality of different sized tapered shims at least one selected shim to be positioned in the wheel assembly of a vehicle to alter the alignment of the assembly by adjusting the camber and toe-in of the wheel assembly by selected amounts, and,
   determining the orientation of the selected shim necessary to alter the alignment of said wheel assembly by the selected amounts of camber and toe-in,
   the wheel assembly including
     an axle member,
     spindle means attached to the axle member for rotatably receiving and carrying a wheel, and
     bolts for removably, fixedly securing the spindle means to the axle member, the bolts each having an imaginary longitudinal centerline,
   each of the tapered shims having a taper different from the taper of the other of the tapered shims and including
     a first contact surface lying in a first imaginary plane;
     a second contact surface lying in a second imaginary plane, the second imaginary plane being at an acute angle with respect to the first plane, the first and second imaginary planes intersecting along a line and each being perpendicular to a third common imaginary plane;
     at least one opening formed through the tapered shim;
   each of the shims being interposed between the spindle means and the axle member in at least one of three operative positions to adjust the alignment of the wheel,
     a first operative position which adjusts only the camber of the wheel;
     a second operative position which adjusts only the toe-in of the wheel; and,
     a third operative position which simultaneously adjusts both the toe-in and camber of the wheel;
   the opening being shaped, contoured and dimensioned such that the bolts pass through the opening when the shim is interposed between the spindle means and the axle member and the bolts are utilized to fixedly secure the spindle means to the axle member;

said orientation apparatus including (a) chart means correlating camber and toe-in adjustment values with the orientation of each of the shims and including
  (i) a first graduated axis indicating toe-in values,
  (ii) a second graduated axis perpendicular to and intersecting said first graduated axis and indicating camber values, each of said values on said first and second axis representing a size of shim and representing the maximum amount by which said represented size of shim can adjust the toe-in and camber of the wheel assembly, said toe-in and camber values increasing by selected increments as the distance along said axes from the intersection of the axes increases,
  (iii) alignment lines interconnecting equivalent values on said first and second axes, each of said alignment lines indicating the amount by which the toe-in and camber of the wheel assembly is altered when a shim of the size represented by the equivalent values interconnected by the alignment line is interposed between the spindle and the axle of said wheel assembly in a selected position with respect to said bolts, said selected position being obtained by rotating the shim about said axis generally parallel to the longitudinal centerline of one of said bolts;

(b) dial means including
  (i) an outer peripheral edge,
  (ii) a point of rotation on said dial means within said outer peripheral edge,
  (iii) a first rule line passing through said point of rotation, and,
  (iv) a second rule line passing through said point of rotation and perpendicular to said first rule line;

(c) mounting means for mounting said dial means on said chart means for
  (i) movement in a first direction parallel to said first graduated axis,
  (ii) movement in a second direction parallel to said second graduated axis, and,
  (iii) rotation about said point of rotation, said orientation apparatus permitting a shim size to be selected by determining the desired toe-in and camber change of the wheel assembly of a vehicle, moving said point of rotation of said dial means along said first graduated axis to the value on said first graduated axis corresponding to said desired toe-in value, moving said dial means to a first reference position by moving said point of rotation away from said first graduated axis and parallel to said second graduated axis a distance equal to the distance from said first graduated axis of the value on said second graduated axis corresponding to said desired camber change, and selecting the one of said alignment lines closest to said first reference position, said selected line interconnecting equivalent values on the first and second graduated axes representing the size of the shim selected.

2. The orientation apparatus of claim 1 wherein said orientation apparatus permits the orientation of said selected shim size with respect to the bolts of the wheel assembly to be determined by rotating said dial means about said first reference position through the shortest arc required to cause one of said first and second rule lines to be colinear with a line passing through said point of rotation and said intersection of said first and second graduated axes.

3. Orientation apparatus for
selecting from a plurality of tapered shims at least one selected shim to be positioned in the wheel assembly of a vehicle to alter the alignment of said assembly by adjusting the camber and toe-in of said wheel assembly by selected amounts, and, determining the orientation of said selected shim necessary to alter the alignment of said wheel assembly by said selected amounts of camber and toe-in, said wheel assembly including
  an axle member having a reference line,
  spindle means attached to said axle member for rotatably receiving and carrying a wheel, and
  bolts for removably, fixedly securing said spindle means to said axle member,
  said bolts each having an imaginary longitudinal centerline, each of said tapered shims including
  a first contact surface lying in a first imaginary plane,
  a second contact surface lying in a second imaginary plane, said second imaginary plane being at an acute angle with respect to said first plane, said first and second imaginary planes intersecting along a line and each being perpendicular to a third common imaginary plane,
  at least one opening formed through said tapered shim,
  a peripheral edge, and
  a reference point selected on said peripheral edge, said acute angle between said first and second contact surfaces being different in each of said plurality of tapered shims and representing the taper of each shim and the maximum amount by which said shim can adjust the toe-in and camber of said wheel assembly;

each of said shims being interposable between said spindle means and said axle member in at least one of three operative positions to adjust the alignment of the wheel,
  a first operative position which adjusts only the camber of the wheel,
  a second operative position which adjusts only the toe-in of the wheel, and
  a third operative position which simultaneously adjusts both the toe-in and camber of the wheel, said opening being shaped, contoured and dimensioned such that
  said bolts pass through said opening when said shim is interposed between said spindle means and said axle member and said bolts are utilized to fixedly secure said spindle means to said axle member,
  when said spindle means is removed from said axle member, said shim can be positioned adjacent said bolts with said longitudinal axes of said bolts generally perpendicular to one of said first and second contact surfaces, rotated about a reference axis to one of said first, second and third operative positions, said reference axis being generally parallel to said longitudinal centerline of one of said bolts and perpendicular to said reference line, and installed on said bolts;

said orientation apparatus including (a) a memory means for storing
  (i) shim selection and orientation information, said shim selection and orientation information including the amount by which each of said tapered shims adjusts the camber and toe-in of said wheel assembly when each of said shims is interposed between said axle member and spindle means in each of a plurality of different positions, each of said different positions being obtained by rotating each of said shims about said reference axis, the distance of said reference point from said reference line differing for each of said different positions of each of said shims, and
  (ii) the desired camber and toe-in adjustment values for a wheel assembly; and, (b) means for comparing said desired camber and toe-in adjustment values with said shim selection and orientation information to select one of said shims to provide said desired camber and toe-in adjustment and for generating signals indicating said selected one of said shims and the one of said different positions of said selected one of said shims required to obtain said desired camber and toe-in adjustment values.

4. The apparatus of claim 3, including video means for displaying an illustration of said selected one of said shims in said one of said different position, said illustration including reference means which represent the rotational position of said selected one of said shims with respect to said reference line such that one of said tapered shims can be placed adjacent said video means and said illustration and rotated to a position corresponding to said one of said different positions of said selected one of said shims in said illustration.

5. The apparatus of claim 4, wherein said reference means is a line indicating the rotation of said selected one of said tapered shims from said reference line.

6. The apparatus of claim 3 wherein a computer comprises said means for comparing said desired camber and toe-in adjustment values with said shim selection and orientation information 7. The apparatus of claim 6 wherein said opening comprises an elongate arcuate opening.

8. The apparatus of claim 7 including at least one knockout structural member which
  (a) defines the shape and dimension of said opening; and,
  (b) when broken off and removed form said shim enlarges said opening.

9. The apparatus of claim 8 wherein said knockout structural member comprises an elongate arcuate member.

10. The apparatus of claim 8 wherein said knockout member completely traverses said arcuate opening.

11. The apparatus of claim 6 wherein each of said plurality of tapered shims includes at least a pair of spaced apart openings, each opening comprising an enclosed elongate arcuate opening.

12. The apparatus of claim 11 including at least one knockout structural member which when broken off and removed from said shim leaves a space interconnecting said elongate arcuate openings.

* * * * *